Nov. 10, 1931.  A. F. SULZER  1,831,793
MOTION PICTURE AND SOUND FILM
Original Filed June 17, 1929
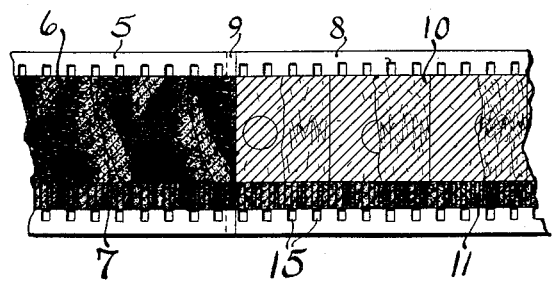
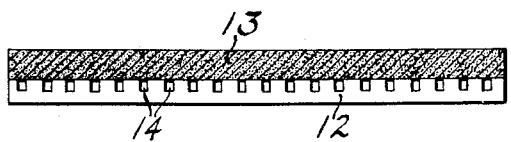
Inventor
Albert F. Sulzer
By Newton M. Pernins
Attorney Patented Nov. 10, 1931

1,831,793

UNITED STATES PATENT OFFICE

ALBERT F. SULZER, OF ROCHESTER, NEW YORK, ASSIGNOR TO EASTMAN KODAK COMPANY, OF ROCHESTER, NEW YORK, A CORPORATION OF NEW YORK

MOTION PICTURE AND SOUND FILM

Original application filed June 17, 1929, Serial No. 371,351. Divided and this application filed July 15, 1929. Serial No. 378,331.

This invention relates to photographic film for use in the synchronized reproduction of sound and motion pictures from the same photographic record.

In a patent of Loyd A. Jones, No. 1,769,518, granted July 1, 1930, there are disclosed a series of films tinted over the entire picture and sound track or sound record areas with tints of such character that the transmission therethrough is uniform and of such character as to operate a photoelectric cell efficiently. It frequently happens that it is desirable to combine such tinted film with "clear sound track" film, that is film having an untinted sound track with tinted picture areas with the result that at the transition from the section of tinted to such "clear sound track" film there is an unpleasant sound volume variation. This type of film is shown in my Patent No. 1,717,815 granted June 18, 1929.

In accordance with the present invention it is proposed to apply to the sound record portion only of such clear sound track film, material which has substantially the same transmission characteristics as the tinted film. The material may be applied as a dye to the film or be incorporated in the material of the support or emulsion layer. In accordance with another feature of the invention it is proposed to apply to the sound track or record portion of a film, a strip of flexible material bearing a dye layer or other suitable medium whereby the transmission through the sound record and the strip are substantially the same as that of tinted film.

For a clearer understanding of the invention reference is made to the drawings in which Fig. 1 shows a strip of film formed of a section of tinted film spliced to a section of normally clear sound track film having its sound track or record area treated in accordance with the present invention; Fig. 2 shows a strip applicable to a clear sound track film to produce the film of my invention.

In Fig. 1 there is represented a section of film 5 having its picture areas 6 and its sound track or record area 7 tinted in accordance with the teachings of the mentioned Jones patent. This section is spliced at point 9 to a section of "clear sound track" film 8 likewise provided with tinted picture areas 10 and a sound track or record area 11. When such a composite strip of film is reproduced, there is an unpleasant sound volume variation in passing from the sound record 7 to the sound record 11 if the latter is clear which is due to the fact that the tinted layer over the sound record 7 absorbs more of the radiations to which the light sensitive cell of the sound reproducing device is responsive than the corresponding sound record area 11. It is therefore proposed to apply to the sound record area 11 material which has substantially the same radiation absorbing power as the tinted layer applied to the sound record 7. Suitable material, which may be applied to this sound record, is disclosed in the mentioned patent of Loyd A. Jones and is referred to therein as a "pearl" tint. When this pearl tint is used on the sound record 11, it may be applied as a layer of tint by any suitable applicator or tinting roll on either side of the film, preferably on the support side.

Instead of applying a layer of tint directly to the film there is shown in Fig. 2 a modified arrangement in which the transmission or radiation absorbing character of this sound record 11 is controlled by applying thereto on either side of the film a strip 12 having a portion 13 treated with suitable material as previously mentioned and adapted to overlap the sound record and to be adhesively connected to the film section 8.

While it is understood that the strip may include only the area 13, it is preferable to provide a margin 12 with a series of perforations 14 spaced to register with the perforations 15 of the film section 8. In this way, when the perforations 14 and 15 are in exact registry, the strip 13 will coincide exactly with the sound record 11. It is intended that the strips such as 13 of the form shown in Fig. 2 may be produced and sold as a separate article of manufacture so that motion picture producers may prepare untinted film whereby the sound record portion thereof may have the same sound reproducing characteristics as the record 7 of the tinted film section shown in section 6.

This application is a division of my application, Serial No. 371,351, filed June 17, 1929. It is obvious that numerous embodiments are possible and I contemplate as included in my invention all such modifications and equivalents as fall within the scope of the appended claims.

Having thus described my invention, what I claim as new and desire to secure by Letters Patent is:

1. A photographic film having uniformly colored picture areas and a sound record area with uncolored material of uniform density appreciably greater than the density of clear film to modify the sound reproducing characteristics thereof.

2. A strip of motion picture film having picture areas and sound record area adapted for use with film having a uniformly tinted layer coextensive with its picture and sound record areas, said strip having its picture areas uniformly colored and its sound record area having applied thereto a uniform material having different color transmission characteristics than the picture area and having the same sound reproducing characteristics as the film with which it is adapted for use.

3. A film strip for the simultaneous reproduction of motion pictures in a single color with audible accompaniment and comprising a transparent flexible support having upon one surface a photographic emulsion, a longitudinally extending area of said film strip comprising the greater part of the width thereof being uniformly colored and constituting a series of motion picture fields; and a second, narrow, longitudinally extending area having applied uniformly thereto material having different light transmitting qualities than the picture area, and said second area constituting a sound record area.

4. A film strip for the simultaneous reproduction of motion pictures in a single color with audible accompaniment and comprising a transparent flexible support having upon one surface a photographic emulsion, a longitudinally extending area of said film strip comprising the greater part of the width thereof being uniformly colored and constituting a series of motion picture fields; and a second, narrow longitudinally extending area with uncolored material of uniform density applied thereto and constituting a sound record area.

Signed at Rochester, New York, this 6th day of July, 1929.

ALBERT F. SULZER.